US010784665B2

(12) United States Patent
Burke et al.

(10) Patent No.: US 10,784,665 B2
(45) Date of Patent: Sep. 22, 2020

(54) THEATRE RACEWAY ASSEMBLY FOR ELECTRICAL AND COMMUNICATION DISTRIBUTION

(71) Applicant: Electronic Theatre Controls, Inc., Middleton, WI (US)

(72) Inventors: Kevin Burke, Madison, WI (US); Thomas Barthel-Steer, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/295,280

(22) Filed: Mar. 7, 2019

(65) Prior Publication Data

US 2019/0288495 A1  Sep. 19, 2019

Related U.S. Application Data

(60) Provisional application No. 62/642,752, filed on Mar. 14, 2018.

(51) Int. Cl.
*H02G 3/10* (2006.01)
*H01R 25/00* (2006.01)
(Continued)

(52) U.S. Cl.
CPC .......... *H02G 3/105* (2013.01); *H01R 25/003* (2013.01); *H01R 25/165* (2013.01); *H02G 3/045* (2013.01); *H02G 3/128* (2013.01)

(58) Field of Classification Search
CPC ........ H02G 3/105; H02G 3/045; H02G 3/128; H01R 25/003; H01R 25/165
(Continued)

(56) References Cited

U.S. PATENT DOCUMENTS 3,588,391 A * 6/1971 Banathy ................. G04C 23/16
200/6 BB
3,692,920 A * 9/1972 Santarelli .................. F16L 3/26
174/501
(Continued)

FOREIGN PATENT DOCUMENTS

EP   0929138 A1   7/1999
EP   1775813 A2   4/2007
(Continued)

OTHER PUBLICATIONS

Search Report issued from the United Kingdom Patent Office for related Application No. GB1903060.0 dated Aug. 29, 2019 (3 Pages).

*Primary Examiner* — Harshad C Patel
(74) *Attorney, Agent, or Firm* — Michael Best & Friedrich LLP (57) ABSTRACT

A theatre raceway comprising an outlet assembly and a back shell. The outlet assembly includes an electrical component mounted to an outlet frame having wire stays for guiding an electrical wire (e.g., a communication wire or a power wire). The wire stays are spaced apart to facilitate access to the wires. The back shell is secured to the outlet assembly and covers the wire stays. In one embodiment, the raceway further comprises an alignment feature that aligns the back shell with the outlet assembly. For example, the alignment feature can comprises a tab on the outlet assembly and a recess on the back shell. The raceway can also include a fastener securing the back shell to the outlet assembly, wherein the fastener includes a head positioned in a recessed portion of the back shell.

18 Claims, 12 Drawing Sheets

(51) Int. Cl.
*H02G 3/04* (2006.01)
*H01R 25/16* (2006.01)
*H02G 3/12* (2006.01)

(58) Field of Classification Search
USPC .................................................. 439/215
See application file for complete search history.

(56) References Cited

U.S. PATENT DOCUMENTS

| | | | | |
|---|---|---|---|---|
| 5,024,614 A * | 6/1991 | Dola | ................... | H02G 3/0431 |
| | | | | 174/486 |
| 5,141,447 A * | 8/1992 | Poirier | ................ | H01R 25/162 |
| | | | | 439/207 |
| 5,594,208 A * | 1/1997 | Cancellieri | ............. | H02G 3/10 |
| | | | | 174/58 |
| 6,831,227 B2 * | 12/2004 | Weise | ................... | H02G 3/086 |
| | | | | 174/135 |
| 6,866,541 B2 * | 3/2005 | Barker | ................ | G02B 6/4452 |
| | | | | 439/540.1 |
| 7,112,748 B2 * | 9/2006 | Hill | ........................ | H02G 3/128 |
| | | | | 174/480 |
| 7,207,835 B2 * | 4/2007 | Levesque | ............... | H04Q 1/068 |
| | | | | 439/540.1 |
| 7,390,977 B2 * | 6/2008 | Hill | ........................ | H02G 3/128 |
| | | | | 174/480 |
| 7,438,566 B2 * | 10/2008 | Chen | .................... | H01R 25/145 |
| | | | | 439/110 |
| 2003/0194904 A1 * | 10/2003 | Rupert | ................ | H01R 13/641 |
| | | | | 439/489 |
| 2005/0150673 A1 * | 7/2005 | Hill | ........................ | H02G 3/128 |
| | | | | 174/53 |
| 2006/0117684 A1 * | 6/2006 | Picard | ...................... | H02G 3/00 |
| | | | | 52/239 |
| 2008/0041623 A1 * | 2/2008 | Makwinski | .......... | H02G 3/0418 |
| | | | | 174/481 |
| 2009/0163074 A1 * | 6/2009 | Arflack | .................. | H02G 3/105 |
| | | | | 439/535 |

FOREIGN PATENT DOCUMENTS

EP 2081263 A1 7/2009
WO 02/33791 A1 4/2002

* cited by examiner

THEATRE RACEWAY ASSEMBLY FOR ELECTRICAL AND COMMUNICATION DISTRIBUTION

CROSS-REFERENCE TO RELATED APPLICATIONS

This application claims priority to U.S. Provisional Patent Application No. 62/642,752, filed Mar. 14, 2018, the entire contents of which are hereby incorporated by reference herein.

BACKGROUND

The present invention relates to theatre lighting equipment, and specifically to a raceway for distribution of power and communications.

Theatres typically include lighting fixtures that provide light to the stage. These fixtures are commonly suspended from a rod that is suspended from an electrical distribution raceway that is mounted to a wall or ceiling near the stage. The raceway provides a means for distributing power and communication signals to the light fixtures.

Connector strips are often constructed of a three-sided channel plate with attached enclosing plates, and are commonly hung from vertical supports spaced along the length of the connector strip. Electrical components and wiring are secured to the three-sided channel prior to attachment to the enclosing plate. If desired, a pipe can be suspended below and parallel to the connector strip to provide a structure for hanging light fixtures.

SUMMARY

The present invention provides a theatre raceway that facilitates easier mounting of electrical components and associated wiring. The raceway comprises an outlet assembly and a back shell. The outlet assembly includes an electrical component mounted to an outlet frame having wire stays for guiding an electrical wire. The wire stays are spaced apart to facilitate access to the wires. The back shell is secured to the outlet assembly and covers the wire stays. Preferably, the outlet assembly comprises multiple outlet assemblies secured to a common back shell. If desired, the raceway guides both a communication wire and a power wire. In this embodiment, the wire stays comprise upper wire stays for guiding the communication wire, and the outlet plate further comprises lower wire stays for guiding the power wire.

In one embodiment, the raceway further comprises an alignment feature that aligns the back shell with the outlet assembly. For example, the alignment feature can comprises a tab on one of the back shell and outlet assembly, and a recess on the other of the back shell and outlet assembly. Preferably, the tab is positioned on the outlet assembly adjacent one of the wire stays.

The raceway can also include a fastener securing the back shell to the outlet assembly, wherein the fastener includes a head positioned in a recessed portion of the back shell.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
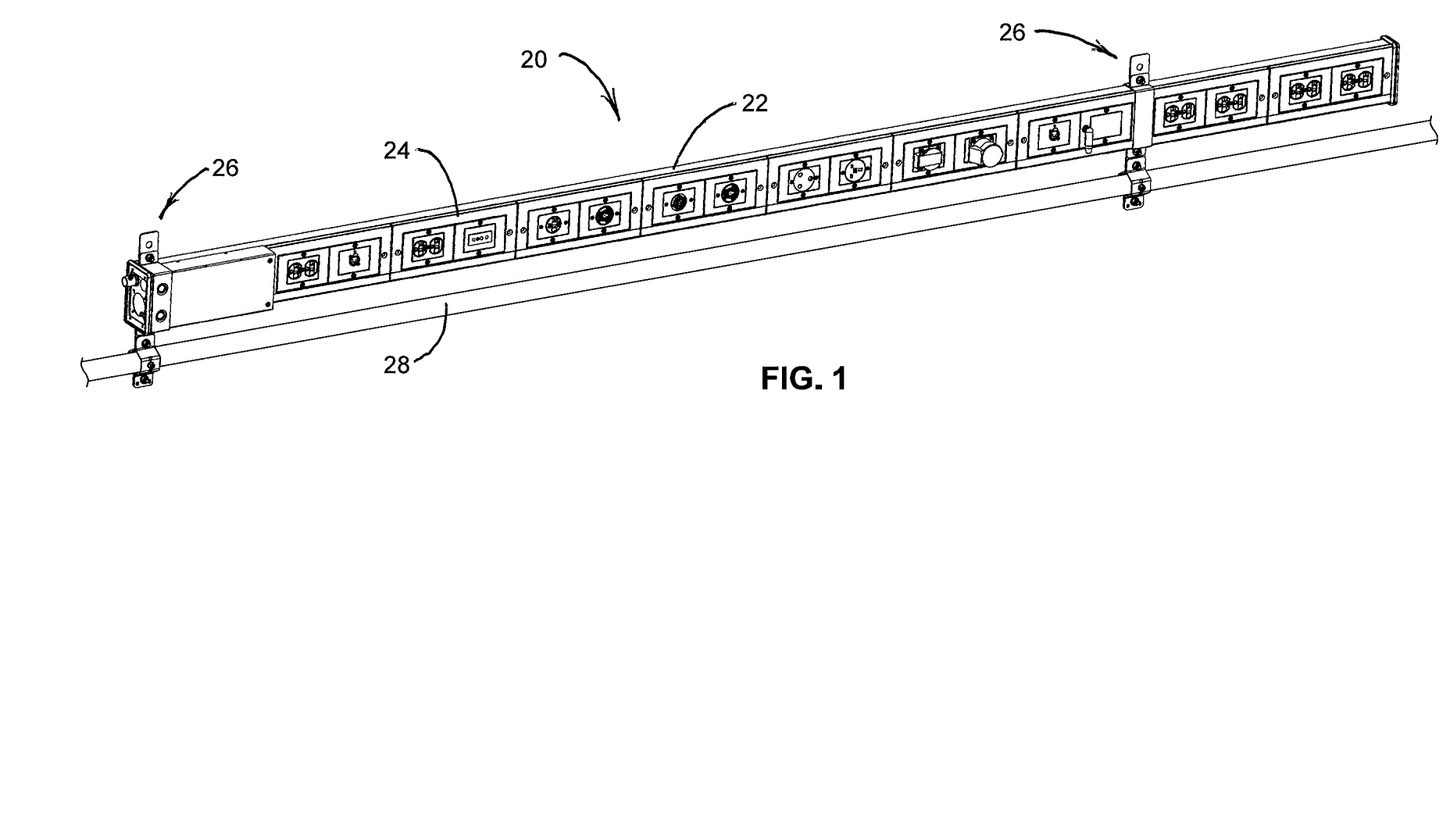
FIG. 1 is a front perspective view of a theatre raceway embodying the present invention.
Figure 2:
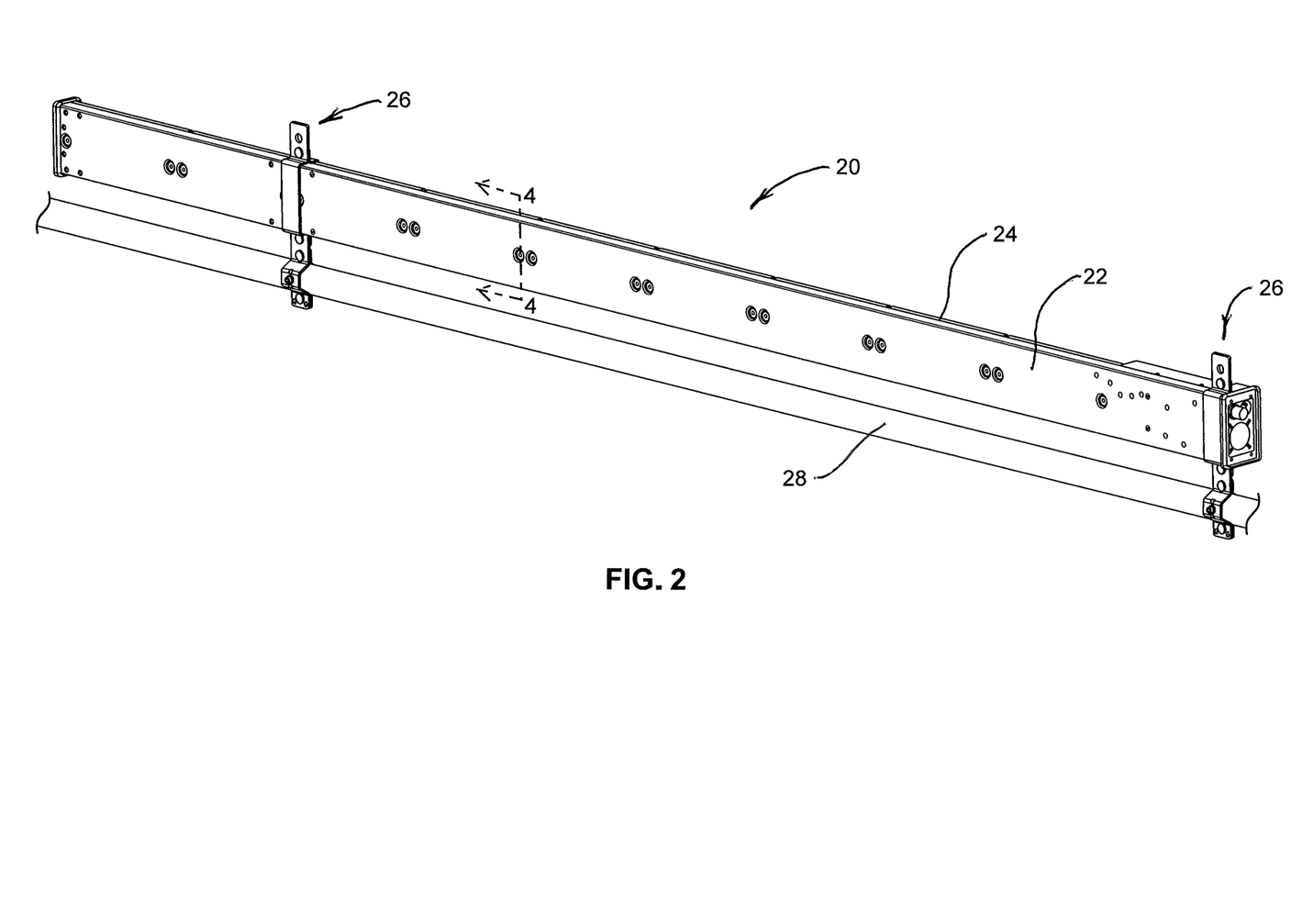
FIG. 2 is a rear perspective view of the raceway in FIG. 1.

Referring to FIGS. 1-2, the illustrated raceway assembly includes a raceway 20 (including a back shell 22 and a series of outlet assemblies 24 secured to and supported by the back shell 22), mounting brackets 26 for attaching the raceway 20 to theatre structure (e.g., a wall, ceiling, or truss), and a support rod 28 for supporting lighting fixtures (not shown).

Figure 3:
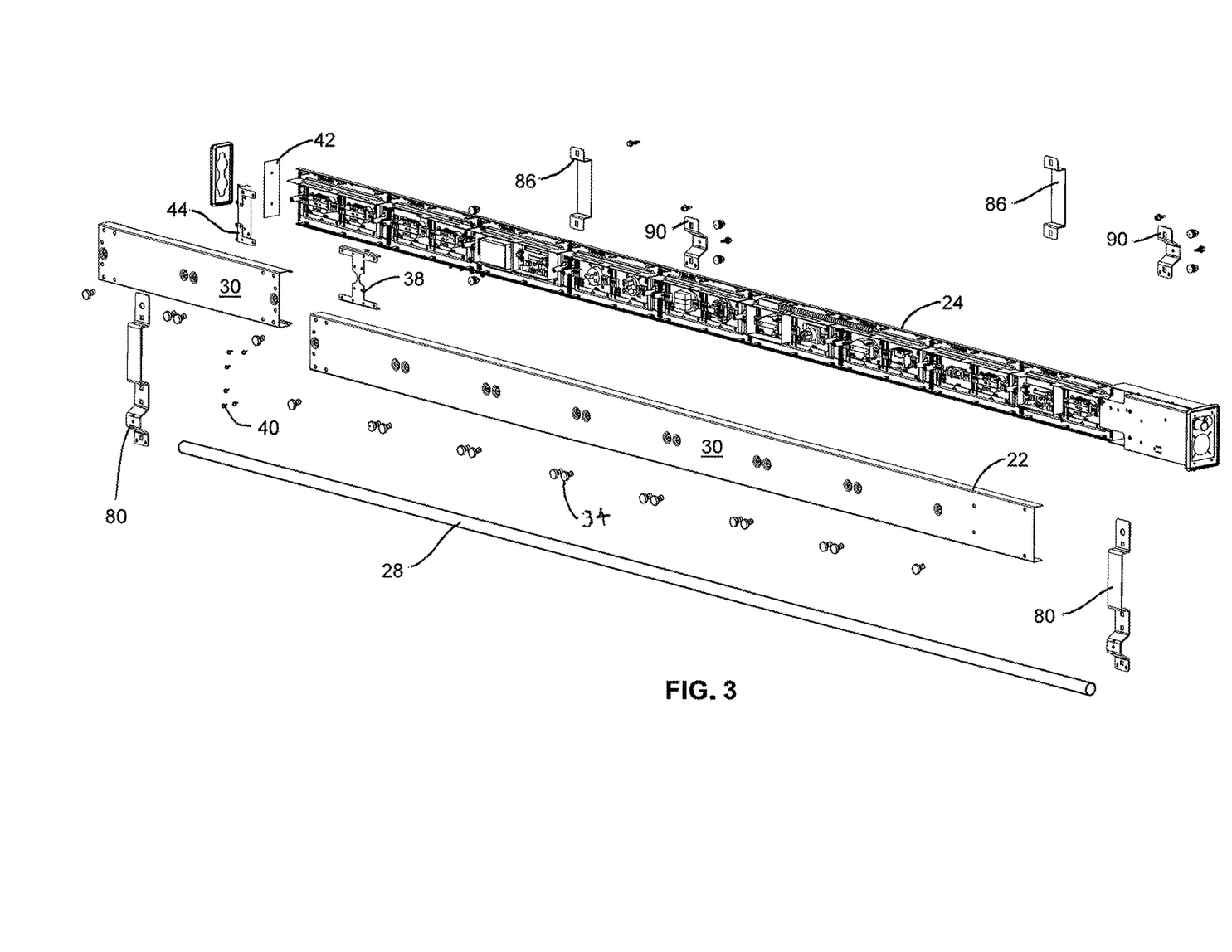
FIG. 3 is a partially exploded view of the raceway in FIG. 2.
Figure 4:
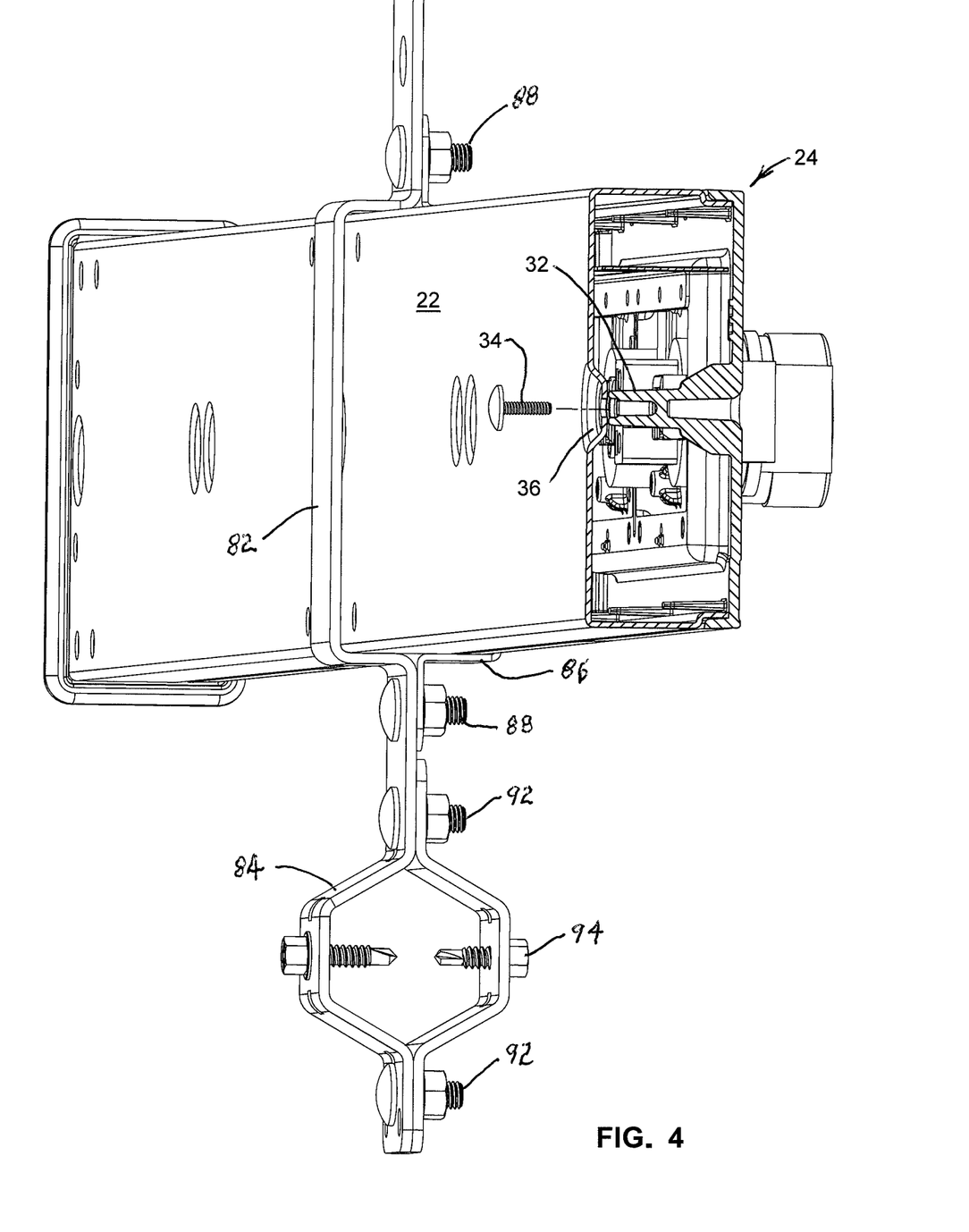
FIG. 4 is a section view taken along line 4-4 in FIG. 2.

As shown in FIG. 3, the illustrated back shell 22 includes U-shaped channels 30 that are attached to raised stanchions 32 on the outlet assemblies 24 by shell fasteners 34. Referring to FIG. 4, the back shell 22 includes a series of recessed portions 36 that stiffen the back shell 22 and provide a space to fully recess the heads of the shell fasteners 34. The recessed portions 36 are designed to engage the raised stanchions 32 when the back shell 22 is secured to the outlet assembly 24.

Referring back to FIG. 3, the joint between the two channels 30 is provided with a splice bracket 38 that facilitates securing the ends of the two adjacent channels 30 with channel fasteners 40. The end of the smaller channel 30 is secured to an end plate 42 by an end bracket 44 and corresponding channel fasteners (not shown in FIG. 3).

Figure 5:
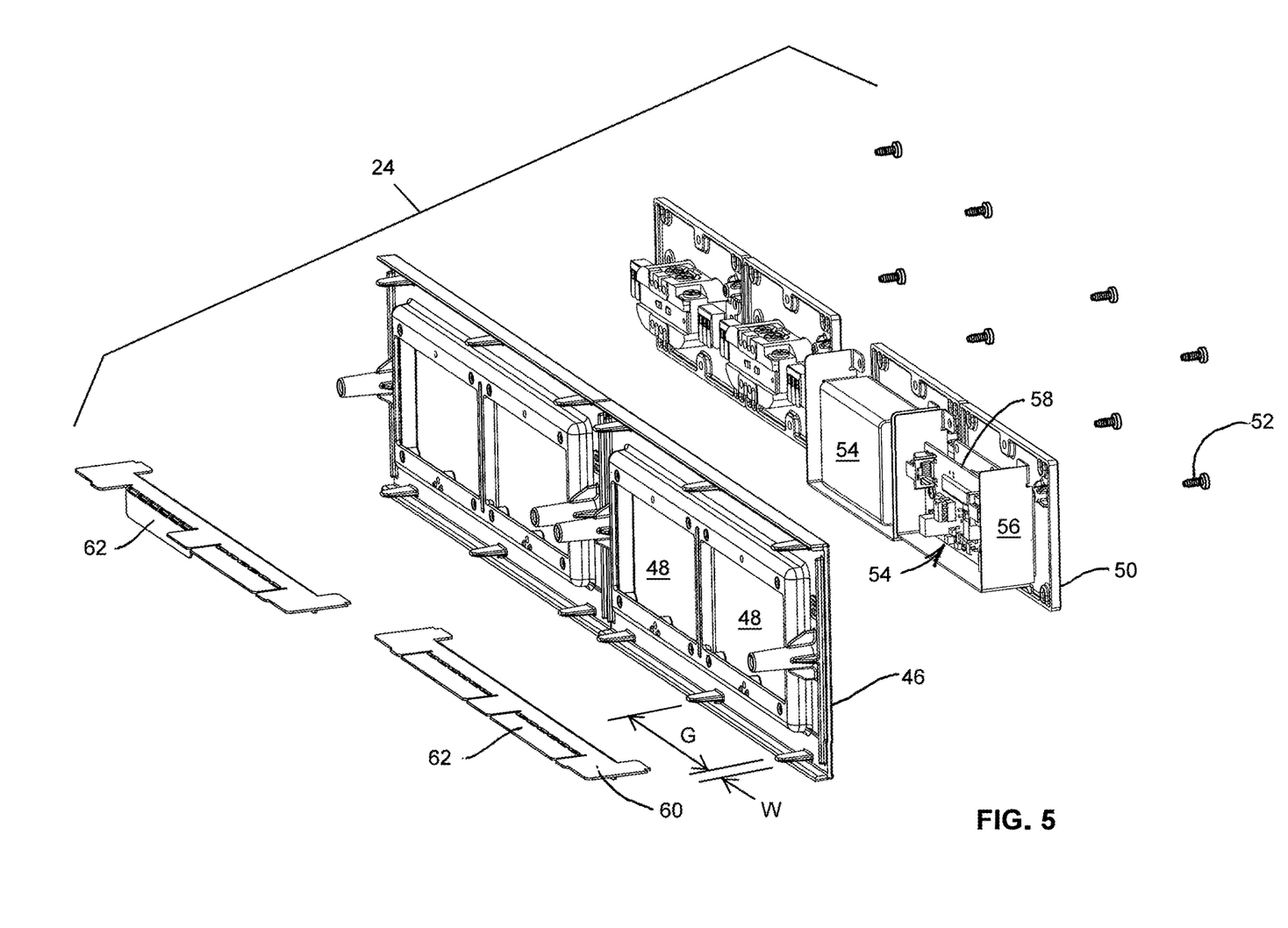
FIG. 5 is a partially exploded rear view of two outlet assemblies from the raceway in FIG. 3.
Figure 6:
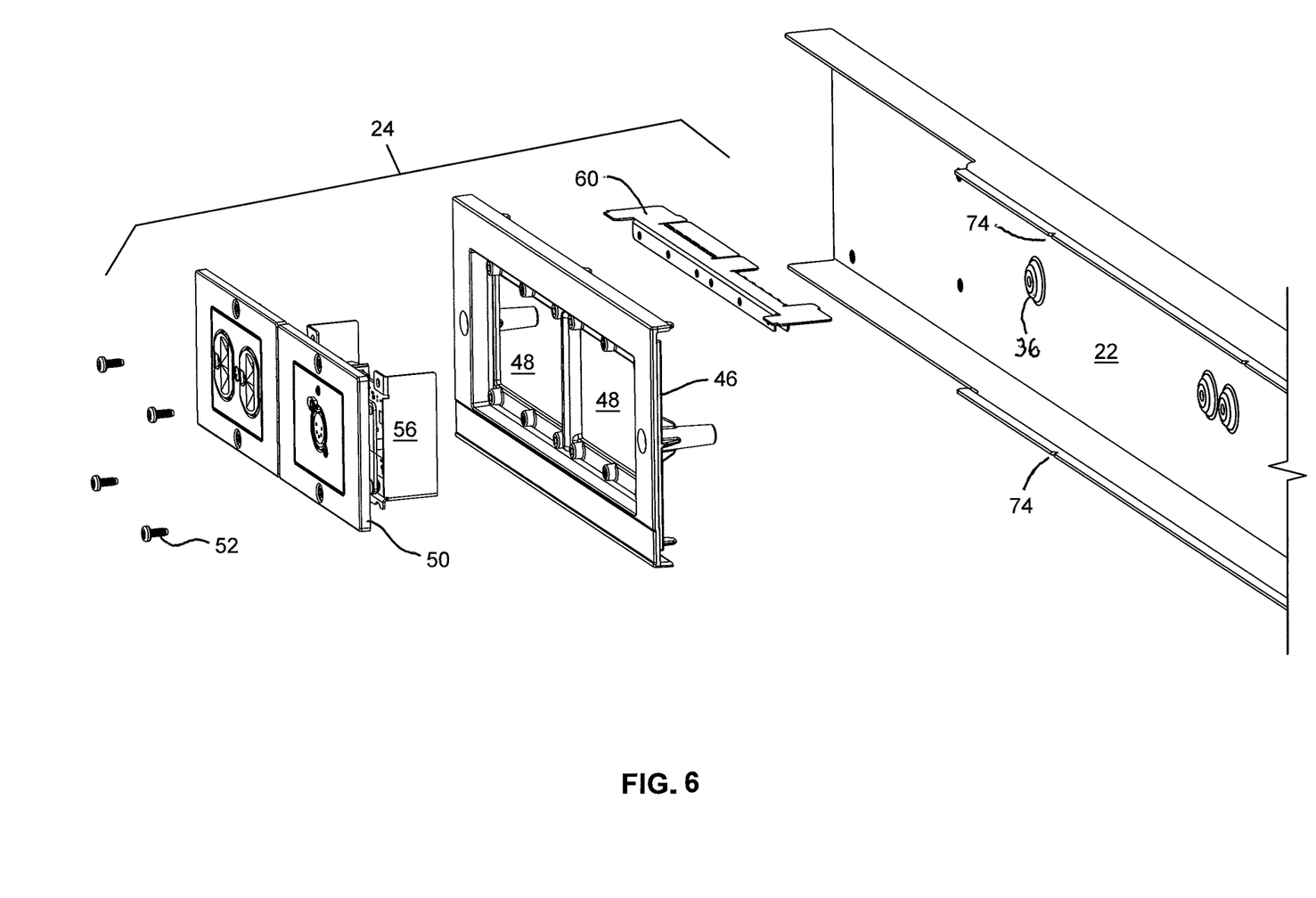
FIG. 6 is a partially exploded front view of one outlet assembly with a back shell.

FIG. 5 shows a rear view of two outlet assemblies 24 positioned side-by-side, and FIG. 6 shows a front view of a single outlet assembly 24. Each outlet assembly 24 includes an outlet frame 46 having two openings 48 that are each sized to receive an outlet plate 50. The outlet plates 50 are each individually secured to a corresponding outlet frame 46 by plate fasteners 52. Each outlet plate 50 can include electrical components 54 that are designed to perform a specific function, such as a power outlet, a communication outlet, a processor, a work light power supply, an emergency lighting outlet.

Voltage barriers are provided to separate voltages. For example, a box barrier 56 can be used to protect a circuit board 58 from high voltage, and a plate barrier 60 can be used to maintain separation of communication wires from other electrical circuitry (see FIG. 10). The box barrier 56 is secured to the corresponding outlet plate 50 with fasteners (not shown), and the plate barrier 60 is secured to the outlet frame. Each plate barrier 60 includes bendable panels 62 that can be bent to allow routing of wires across the plate barrier 60.

Figure 7:
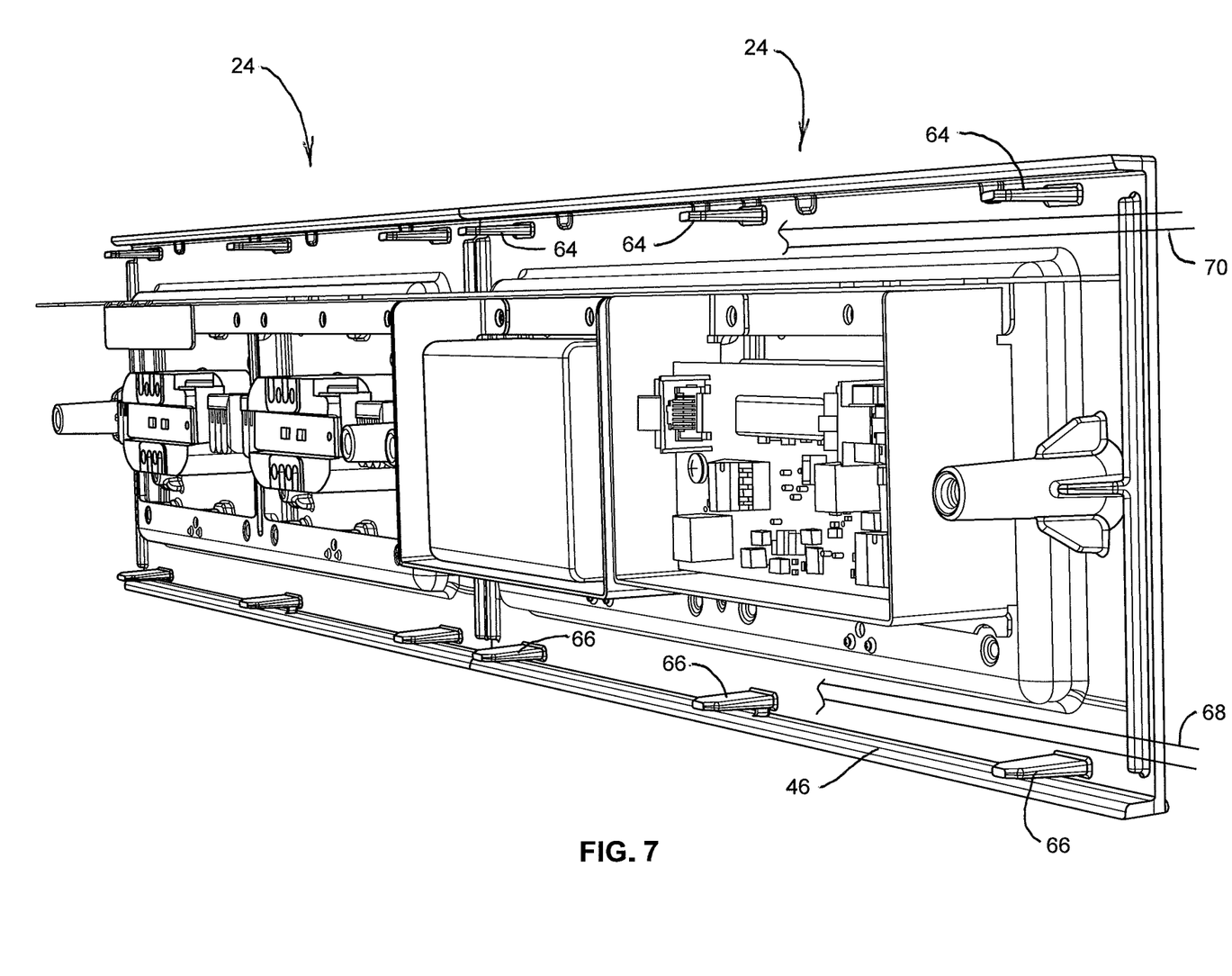
FIG. 7 is an assembled view of the outlet assembly in FIG. 4.

Two adjacent outlet assemblies 24 are shown in FIG. 7. Each outlet frame 46 includes upper wire stays 64 and lower wires stays 66 that are designed to maintain a position of electrical wires (e.g., power wires or communication wires) being routed across the outlet assemblies 24. Specifically, the lower wire stays 66 provide guidance to power wires 68 positioned on a lower side of the outlet assemblies 24, and the upper wire stays 64 provide guidance to communication wires 70 positioned on an upper side of the outlet assemblies 24. The stays 64,66 are discrete structural members that are spaced from each other to provide a gap between the stays to facilitate insertion of the wires 68,70 and connecting the wires 68,70 to the electrical components 54 of the outlet assemblies 24. In the illustrated embodiment, the stays 64,66 have a width W in a direction parallel to the wires 68,70 being guided, and the gap G between the stays 64,66 is at least equal to the width W of the stays 64,66 and is preferably at least about ten times the width W of the stays 64,66. In other embodiments the gap G is at least about five times the width W.

Figure 8:
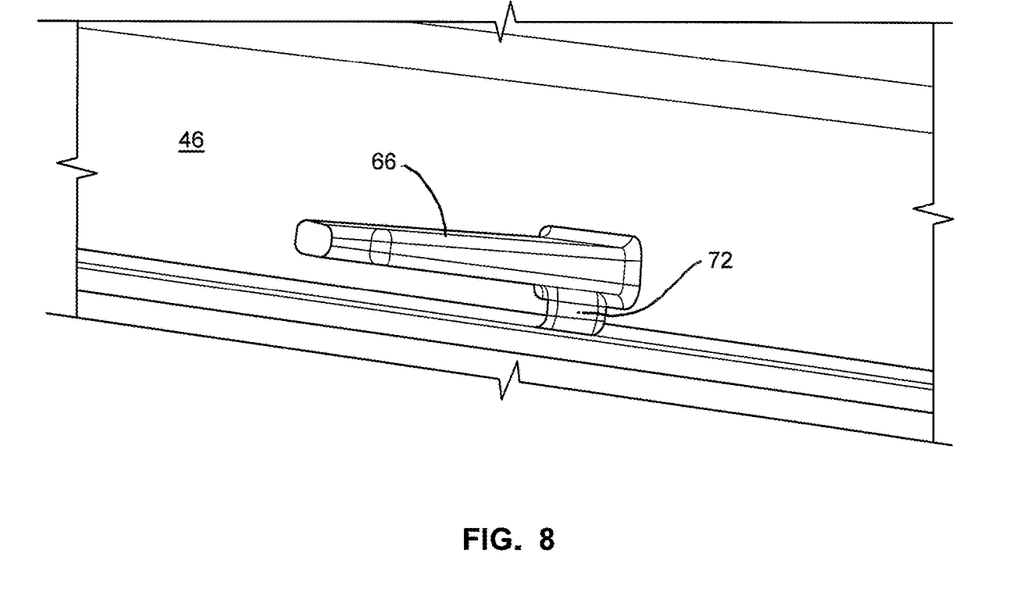
FIG. 8 is an enlarged perspective view of a portion of an outlet frame from the outlet assembly in FIG. 6.

As shown in FIG. 7, each illustrated outlet frame 46 includes three upper wire stays 64 and three lower wire stays 66. Adjacent the middle stay of each of the groups of three, there is provided a triangular alignment tab 72 (see FIG. 8) that facilitates alignment of the outlet assemblies 24 with triangular alignment notches 74 in the back shell 22 (see FIG. 9).

Figure 10:
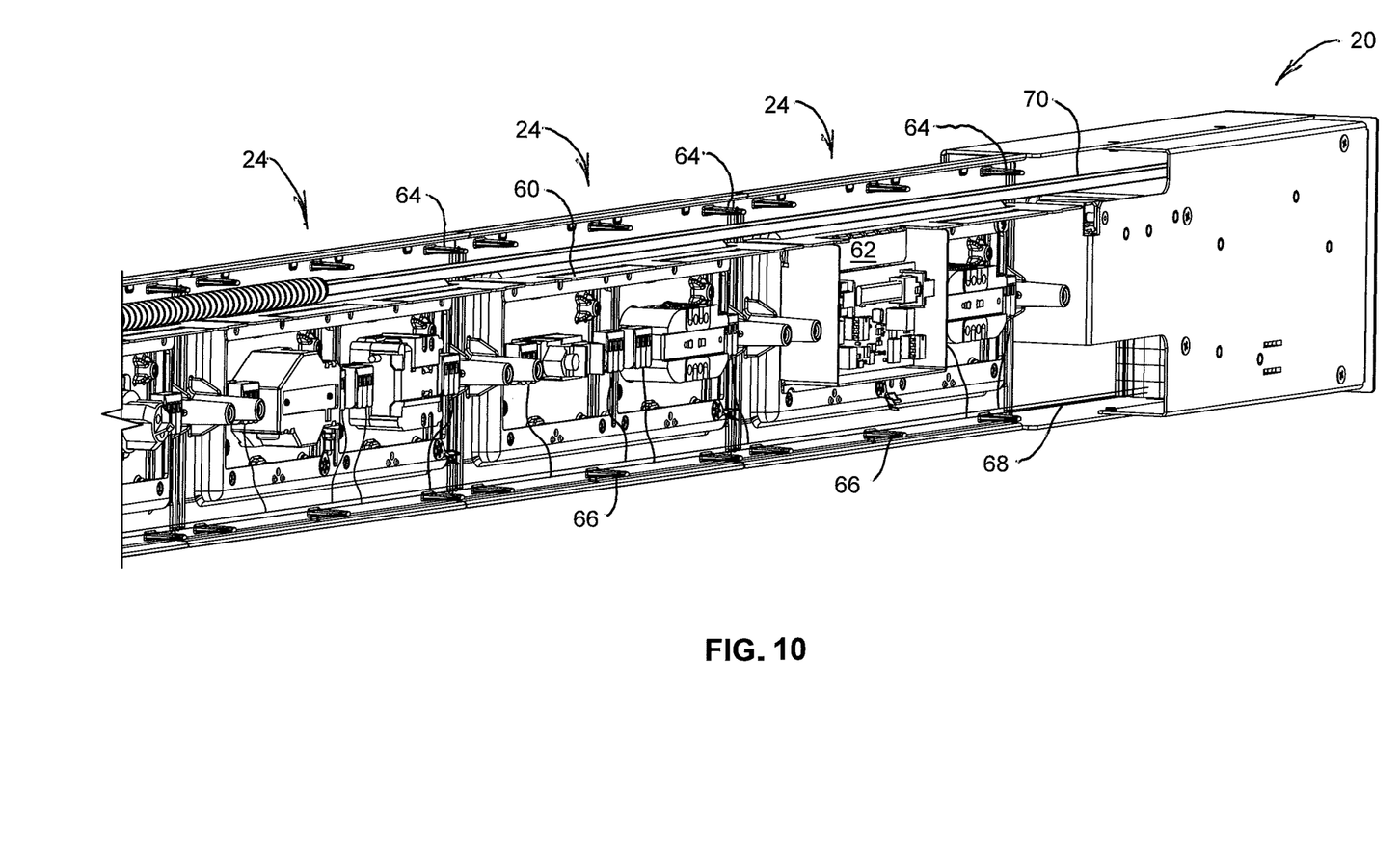
FIG. 10 is a rear perspective view of the raceway with the back shell removed, showing the power and communications wiring.

FIG. 10 illustrates the routing of communication wires 70 and power wires 68 through the raceway 20. As shown, the communication wires 70 travel along an upper side of the raceway 20 between the upper wire stays 64 and the plate barriers 60. One of the bendable panels 62 in FIG. 10 is bent to allow passage of communication wires 70 to the circuit board 58. The power wires 68 travel along a lower side of the raceway 20 above the lower wire stays 66 and can be selectively connected to the electrical components 54.

Figure 9:
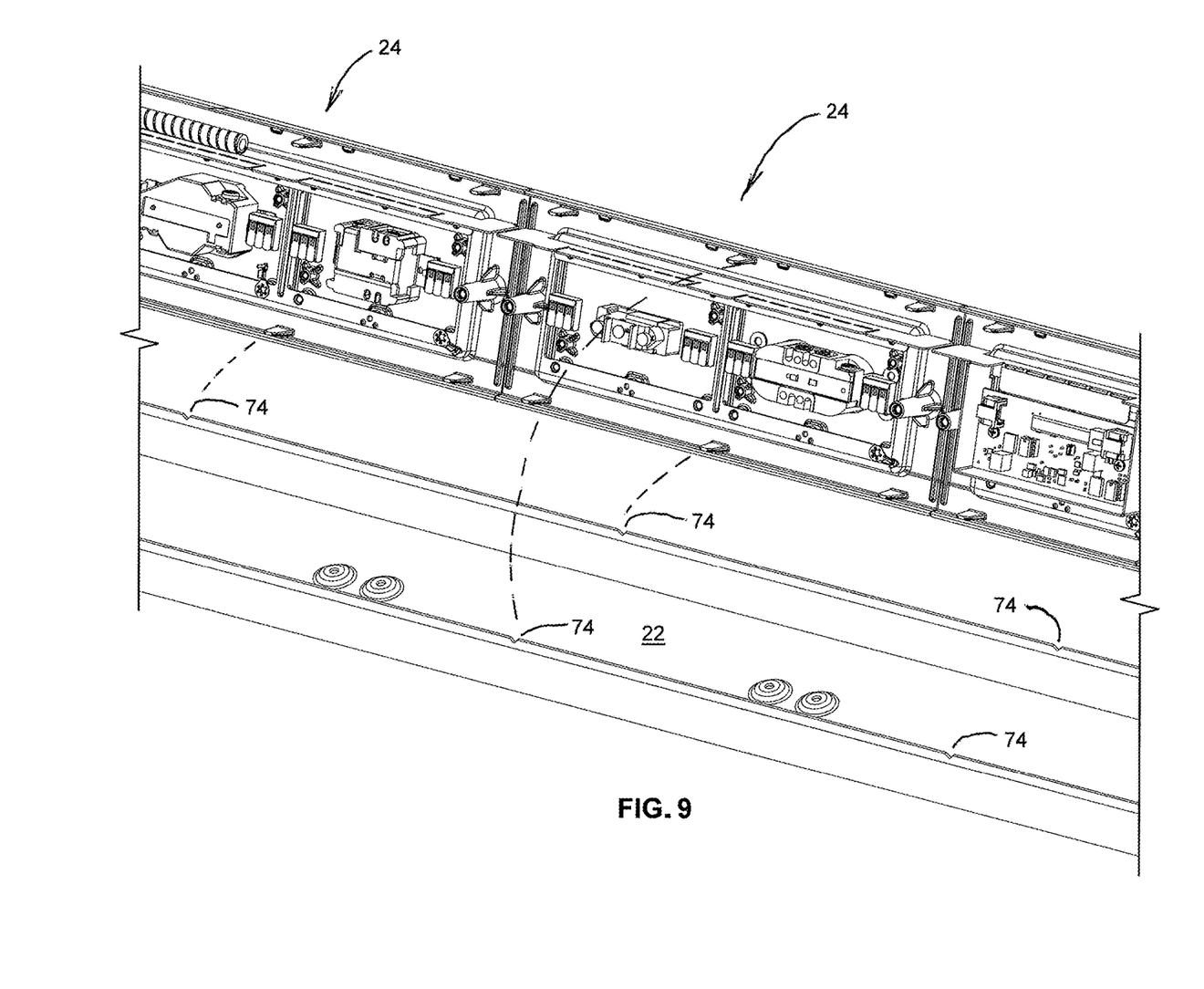
FIG. 9 is a rear perspective view of a portion of the raceway of FIG. 2 with the back shell partially exploded.

To assemble the above-described raceway 20, the outlet plates 50 are secured to the corresponding outlet frames 46 and voltage barriers to create the desired number of outlet assemblies 24. The outlet assemblies 24 are then laid face down in the desired side-by-side relationship, as generally depicted in FIG. 9. If desired a jig (not shown) can be used to hold the outlet assemblies 24 in position relative to each other. In this face down orientation, the power wires 68 can be routed adjacent the inside surface of the lower wire stays 66, and the communication wires 70 can be routed between the inside surface of the upper wire stays 64 and the plate barriers 60. If access by a communication wire 70 to an electrical component 54 is needed, the bendable panel 62 for that component can be bent about ninety degrees. Any desired electrical connections between the wires 68,70 and the electrical components 54 can then be made. By virtue of the large spaces between adjacent stays (i.e., between adjacent upper wire stays 64 or adjacent lower wire stays 66), this routing and connecting of the wires can be more easily accomplished.

After the wiring has been completed, the back shell 22 (either a single channel 30 or multiple channels 30 spliced together) is coupled to the outlet assemblies 24. To do this, the triangular notches 74 on the back shell 22 are aligned with the triangular tabs 72 on the outlet plates 50, and the back shell 22 is brought into contact with the outlet assemblies 24. In this assembled condition, the alignment tabs 72 are received in the alignment notches 74. The shell fasteners 34 are used to secure the back shell 22 to the outlet assemblies 24.

As mentioned above, the raceway 20 can be suspended from structure in the theatre using the mounting bracket 26. Referring to FIGS. 1-4 and 11, the illustrated mounting bracket 26 includes a back plate 80 having an upper portion 82 dimensioned to partially receive the back shell 22, and a lower portion 84 dimensioned to partially receive the support rod 28. An upper plate 86 is secured to the upper portion 82 with fasteners 88 to sandwich the raceway 20 in between, and a lower plate 90 can be secured to the lower portion 84 with fasteners 92 to sandwich the support rod 28 in between. Self-tapping screws 94 can be used to secure the support rod 28 to the lower plate 90 and/or the lower portion 84 of the back plate 80 for anti-rotation.

Figure 11:
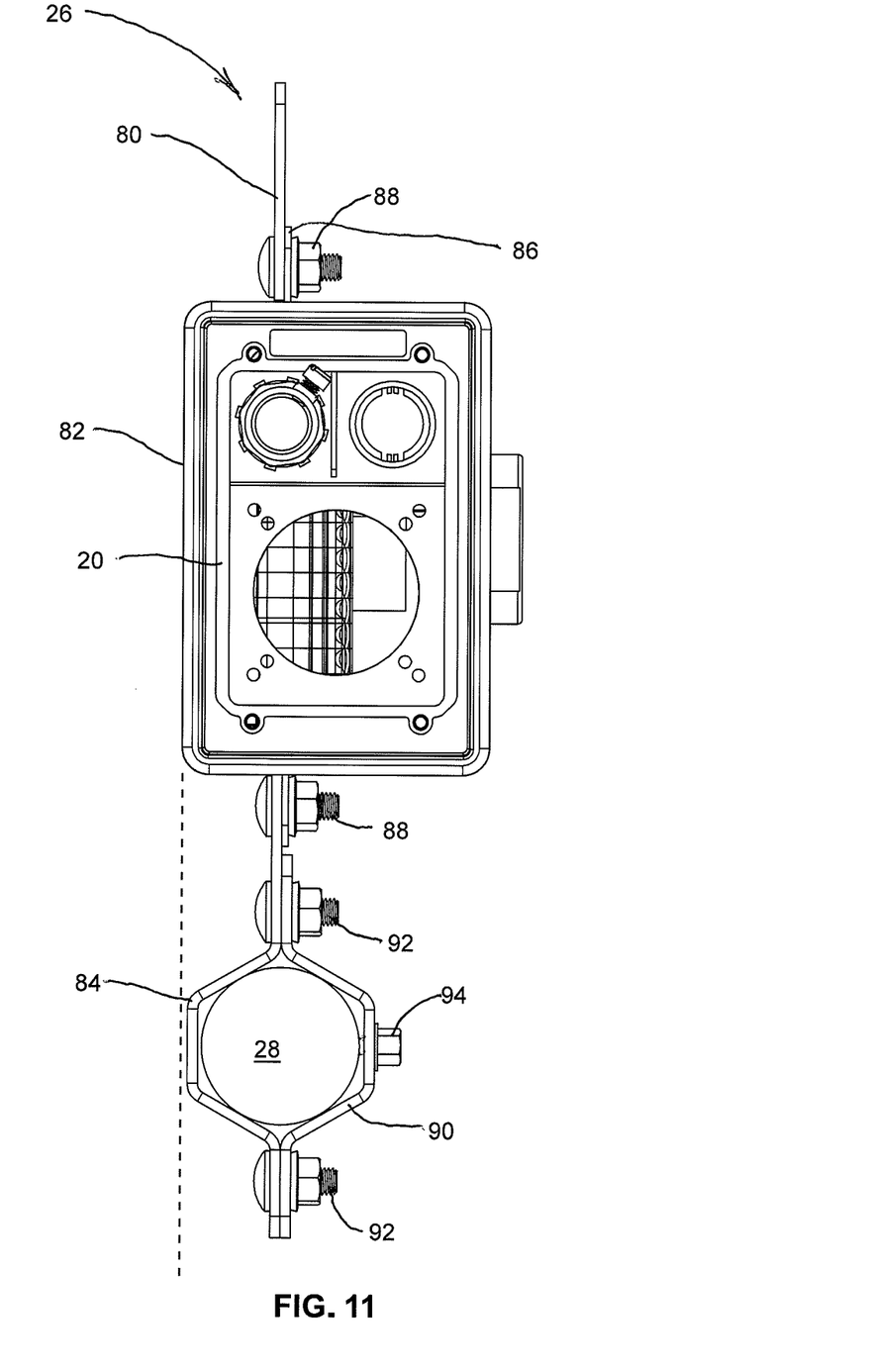
FIG. 11 is an end view take from the left side of the raceway in FIG. 1.
Figure 12:
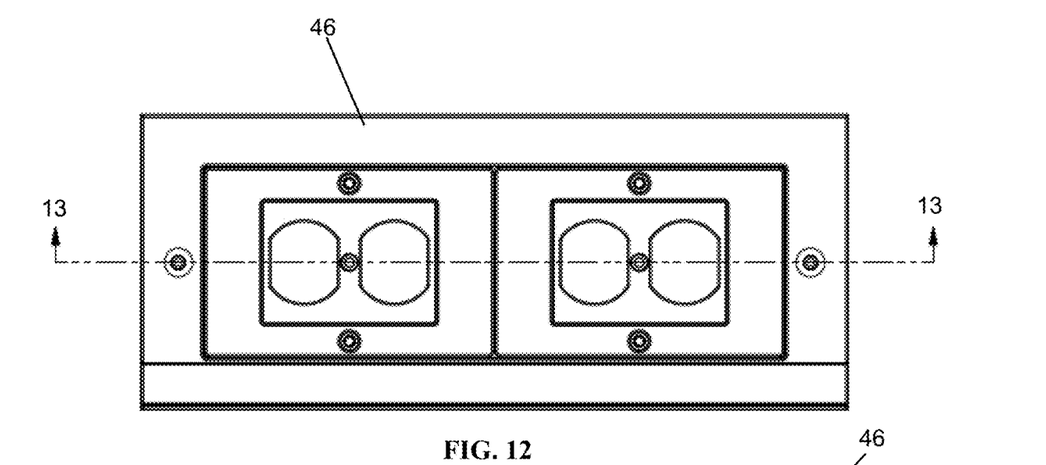
FIG. 12 is a front side view of an outlet frame of the raceway in FIG. 1.
Figure 13:
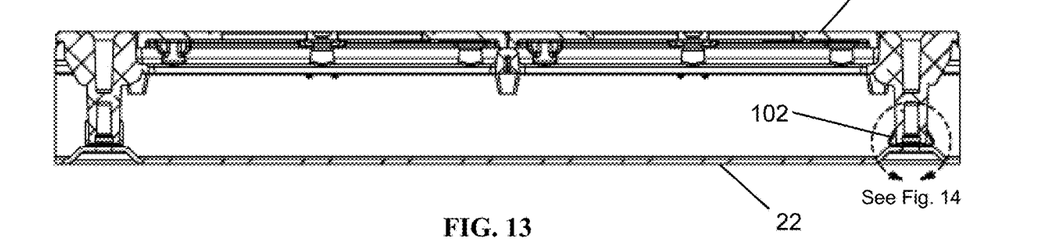
FIG. 13 is a cross-sectional view taken along line 13-13 in FIG. 12 showing the outlet frame attached to the back shell.
Figure 14:
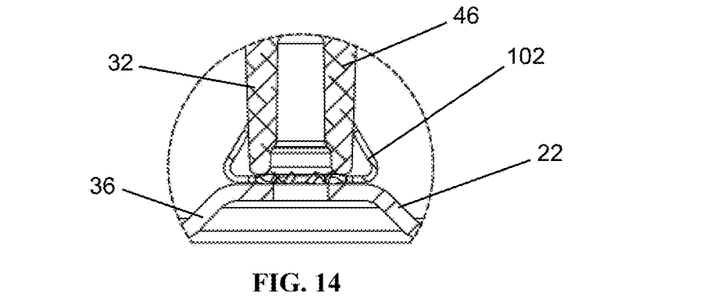
FIG. 14 is an enlarged view of FIG. 13.
Figure 15:
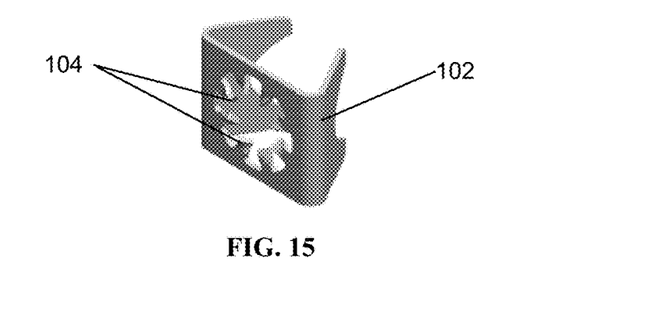
FIG. 15 is a perspective view of a frame bonding device of the raceway in FIG. 1.

FIG. 11 shows the alignment of the back surfaces of upper and lower portions 82,84 of the back plate 80. By virtue of this arrangement, the back surface of the raceway 20 can be mounted to a wall 96 without interference with the support rod 28.

FIGS. 12-15 illustrate how in one possible embodiment, the outlet frame 46 is electrically bonded to the back shell 22 using a bonding device 102. The bonding device 102 is attached to the raised stanchion 32 of the outlet frame 46. The bonding device 102 attaches to the raised stanchion 32 by an interference fit in one embodiment. The bonding device 102 includes teeth 104 between the stanchion 32 and the recessed portion 36 of the back shell 22. The teeth 104 pierce any paint or oxides on the outlet frame 46 and the back shell 22 to provide low resistance electrical bonding between the frame 46 and shell 22.

The invention claimed is:

1. A theatre raceway comprising:
   an outlet assembly including an outlet frame and an electrical component mounted to the outlet frame, the outlet frame having wire stays for guiding an electrical wire of the electrical component, the wire stays being spaced apart to facilitate access to the electrical wire;
   a back shell secured to the outlet assembly and covering the wire stays, and
   a plate voltage barrier that extends along the electrical wire between the electrical wire and the electrical component, the plate voltage barrier includes a bendable panel that is removable to route the electrical wire to the electrical component.

2. A theatre raceway as claimed in claim 1, wherein the outlet assembly comprises multiple outlet assemblies secured to a common back shell.

3. A theatre raceway as claimed in claim 1, wherein the wire stays comprise upper wire stays for guiding a communication wire, and wherein the outlet frame further comprises lower wire stays for guiding a power wire.

4. A theatre raceway as claimed in claim 3, further comprising an alignment feature that aligns the back shell with the outlet assembly.

5. A theatre raceway as claimed in claim 4, wherein the alignment feature comprises a tab on one of the back shell and outlet assembly, and a recess on the other of the back shell and outlet assembly.

6. A theatre raceway as claimed in claim 5, wherein the tab is positioned on the outlet assembly adjacent one of the wire stays.

7. A theatre raceway as claimed in claim 1, wherein the wire stays are fixed to the outlet frame.

8. A theatre raceway comprising:
an outlet assembly including an outlet frame and an electrical component mounted to the outlet frame, the outlet frame having wire stays for guiding an electrical wire of the electrical component, the wire stays each having a width and adjacent wire stays being spaced apart by a gap at least five times the width to facilitate access to the electrical wire;
a back shell removably coupled to the outlet assembly and covering the wire stays, the back shell including a U-shaped channel, and
a plate voltage barrier that extends along the electrical wire between the electrical wire and the electrical component, the plate voltage barrier includes a bendable panel that is removable to route the electrical wire to the electrical component.

9. A theatre raceway of claim 8, wherein the outlet frame includes an opening, the electrical component removably coupled to the outlet frame within the opening.

10. A theatre raceway as claimed in claim 8, wherein the outlet frame includes a raised stanchion that receives a fastener, the fastener extends through the back shell and into the raised stanchion to couple the outlet assembly to the back shell.

11. A theatre raceway as claimed in claim 10, wherein the fastener includes a head positioned in a recessed portion of the back shell.

12. A theatre raceway as claimed in claim 8, wherein the gap is at least ten times the width.

13. A theatre raceway as claimed in claim 8, wherein the outlet assembly comprises multiple outlet assemblies secured to a common back shell.

14. A theatre raceway as claimed in claim 8, wherein the wire stays comprise upper wire stays for guiding a communication wire, and wherein the outlet frame further comprises lower wire stays for guiding a power wire.

15. A theatre raceway as claimed in claim 8, further comprising an alignment feature that aligns the back shell with the outlet assembly.

16. A theatre raceway as claimed in claim 15, wherein the alignment feature comprises a tab on one of the back shell and outlet assembly, and a recess on the other of the back shell and outlet assembly.

17. A theatre raceway as claimed in claim 16, wherein the tab is positioned on the outlet assembly adjacent one of the wire stays.

18. A theatre raceway as claimed in claim 8, further comprising a support rod coupled to the back shell, the support rod configured to support lighting fixtures.

* * * * *